United States Patent [19]

McGuiness et al.

[11] Patent Number: 5,267,657

[45] Date of Patent: Dec. 7, 1993

[54] BICYCLE STAND

[76] Inventors: John D. McGuiness, 73 Forster St., St. Catharines, Ontario, Canada, L2N 2A6; Paul A. Smith, 105 Welland Vale Rd. R.R. 3, St. Catharines, Ontario, Canada, L2R 6P9

[21] Appl. No.: 683,197

[22] Filed: Apr. 10, 1991

[30] Foreign Application Priority Data

Apr. 27, 1990 [CA] Canada .................................. 2015674

[51] Int. Cl.⁵ .............................................. A47F 7/00
[52] U.S. Cl. .......................................... 211/22; 211/17; 211/73
[58] Field of Search .................... 211/22, 23, 24, 20, 211/17, 73

[56] References Cited

U.S. PATENT DOCUMENTS

| | | | |
|---|---|---|---|
| 731,651 | 6/1903 | Allen | 211/20 |
| 4,050,583 | 9/1977 | Szalio | 211/20 |
| 4,856,659 | 8/1989 | Kreles | 211/24 |
| 5,036,986 | 8/1991 | Kral | 211/22 |

FOREIGN PATENT DOCUMENTS

| | | | |
|---|---|---|---|
| 2850763 | 11/1978 | Fed. Rep. of Germany | 211/22 |
| 78272 | 5/1955 | Netherlands | 211/20 |
| 558041 | 12/1943 | United Kingdom | 211/20 |
| 2129387 | 5/1984 | United Kingdom | 211/22 |

*Primary Examiner*—Alvin C. Chin-Shue
*Assistant Examiner*—Korie H. Chan
*Attorney, Agent, or Firm*—Dennison, Meserole, Pollack & Scheiner

[57] ABSTRACT

A bicycle stand is disclosed for supporting a bicycle or bicycles in an upright position. The bicycle stand comprises a molded or formed plastic body comprising either a hollow container with a flat undersurface and a fill-plug and cap on the upper surface or a seat surrounding the perimeter of the base of the stand with receptacles for ballast on the upper surface. The hollow container or receptacles are capable for receiving and containing a ballast material, such as sand, water, decorative stone, earth or cement. The stand is provided on its upper surface with one or more grooves of appropriate dimension for receiving the wheel of a bicycle or wheels of a plurality of bicycles.

15 Claims, 7 Drawing Sheets

A - A

BICYCLE STAND

FIELD OF THE INVENTION

This invention relates to a bicycle stand for supporting a bicycle or bicycles in an upright position.

The use of a bicycle stand decreases the probability of damage to a bicycle when not in use. Damage to a bicycle often occurs when laying it on its side on the ground or placing it against a support structure such as a wall or tree whereby the bicycle may be unstable and likely to fall over. Moreover, the use of a bicycle stand provides other advantages such as maintaining bicycle in a stable upright position whereby it is immediately available for use, storing an assembled bicycle in as compact a fashion as possible, and providing a means to support a bicycle while any necessary repairs or adjustments are effected.

DESCRIPTION OF THE RELATED ART

Hitherto, various types of bicycle stands have been manufactured which serve to support a bicycle when not in use. Canadian Patent No. 487,633 (Odoni) describes a metal trough arrangement wherein a bicycle can be supported by wheeling the front tire into the trough and allowing it to rest in a depression of half round section. The trough, itself, is supported by a metal frame and is of appropriate dimension so as to provide support to the bicycle. An inherent disadvantage of this arrangement is its bulkiness making it difficult to transport and/or store. As well, the design is rather complex and is, thus, difficult and costly to manufacture.

Another common bicycle stand comprises a cement block containing grooves into which a bicycle wheel can enter, whereby to support a bicycle. The cement block can be either self-contained or a permanent part of a larger structure such as a sidewalk or building wall. Such an arrangement has the disadvantage of being, if permanently fixed, unmovable and, if self-contained, too heavy to conveniently store or transport. As well, this arrangement is not practical for the home owner, but more suited for public use facilities.

Another type of bicycle stand includes the conventional kick-type (of one or two legs) designed to be fixed to a bicycle frame in a location whereby a kick to the leg of the stand places it in a position which will provide support to the bicycle and maintain it in an upright position. This type of stand has the obvious advantage of portability with the bicycle and, thus, always available for use. However, it suffers from the disadvantage of instability of support as a result of which very little force is required to tip the bicycle over and the added weight it contributes to the bicycle affects cycling performance. Another prior system is described in Canadian Patent No. 945,944 (Lahay) wherein the concept of a channel in a block of material for the retention of an object therein is taught. As well, Canadian Patent No. 1,039,257 (Geiger) discloses a one piece injection-molded plastic body containing grooves which serve to support billfolds. Finally, Canadian Patent No. 1,231,695 (Berney) teaches a hollow umbrella support base of molded plastic into which fluid ballast material can be introduced.

SUMMARY OF THE INVENTION

It is an object of the present invention to eliminate the inherent disadvantages of prior methods, and to provide a stand for supporting a bicycle or bicycles which affords sufficient support to and is light-weight and of suitable dimensions to permit ready transportation and/or storage.

Accordingly, the invention provides a bicycle stand for supporting a bicycle or bicycles in an upright position, which stand comprises a molded or formed body including a receptable for ballast material; said body having an upper surface formed with one or more grooves extending transversely therethrough for the reception of a bicycle wheel or wheels, wherein said grooves are integral with said molded or formed body and are of appropriate dimensions to receive and support the wheel of a bicycle. The stand may comprise a molded or formed body including receptacles formed in the upper surface thereof for receiving and containing a ballast material. Alternatively, the body is in the form of a hollow container which itself comprises the receptacle for ballast material. The body of the stand has either a flat undersurface or a seat surrounding the perimeter of the base of the stand adapted to rest securely on a ground surface, and an upper surface formed with grooves extending therethrough for the reception of a bicycle wheel. The grooves are integral with the molded or formed body and are of appropriate dimension to receive and support the rim of a bicycle wheel.

In one embodiment of the invention, the upper surface of the bicycle stand body is formed with intersecting diagonal grooves wherein one groove is of appropriate dimension to support a narrow rim tire size and the other a wide rim tire size. Alternatively, a pair of spaced parallel grooves can be provided in the upper body surface, which parallel grooves can be of similar or different widths as required. In this embodiment of invention, it is preferable that the bicycle stand is constructed of blow-molded plastic and has an internal volume of approximately 7 gallons with external dimensions of approximately 8 inches in height by 18 inches square. It is alternatively preferable that the bicycle stand is constructed of injection-molded plastic and has external dimensions of approximately 6.5 inches in height by 18 inches square. The ease of construction and simple design contribute to a low cost manufacture of the bicycle stand. Optionally, there may be provided security means in the form of a loop connected to the stand body which security means is adapted to accept a bicycle locking device. In preferred form the loop is disposed on the upper surface of the stand and has approximate dimensions of 1⅝ inches in length, ⅜ inch in width and 1⅝ inches in height with a 1 inch diameter hole.

A further embodiment of invention provides a bicycle stand body formed with three grooves, the outer two of which converge toward a centre groove which bisects the stand and wherein the three grooves are of any combination of appropriate dimensions so as to support a narrow rim tire size or a wide rim tire size. In this embodiment, it is preferable that the bicycle stand is constructed of either injection-molded plastic of 0.08 inch wall thickness with external dimensions of 6.5 inches in height by 18 inches square or blow-molded plastic with external dimensions of 8 inches in height by 18 inches square. Optionally, the stand may be provided with security means in the form of one or more loops, preferably two, connected to the stand body, the security means being adapted to accept a bicycle locking device. It is preferable that the loops are disposed on the upper surface of the stand and have approximate dimensions of 1⅝ inches in length, ⅝ inch in width and 1⅝ inches in height with a 1 inch diameter hole.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENTS

Figure 1:
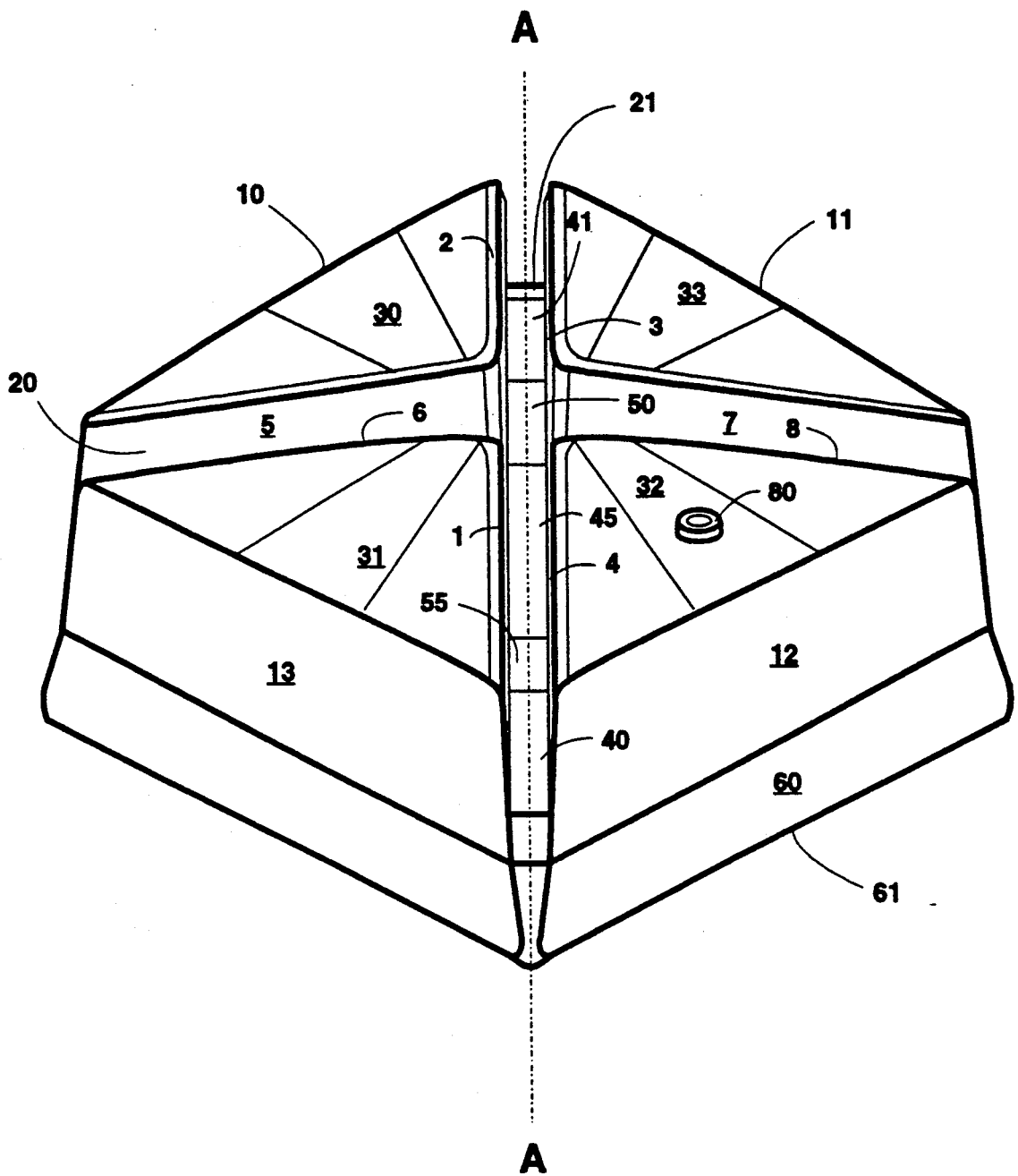
FIG. 1 is a perspective view of a bicycle stand.

Referring now to the drawings, the bicycle stand of the present invention as shown in FIG. 1 comprises a one piece blow-molded plastic body designed to provide adequate support to a bicycle wheel such that a bicycle can be placed in a stable vertical upright position when not in use. The bicycle stand includes a generally square shaped base having outer side walls 10, 11, 12 and 13. The side walls 10 to 13 are each the same height and generally taper upwardly and outwardly from the bottom and then upwardly and inwardly towards the top. The bicycle stand also includes four triangular upper surface segments 30, 31, 32 and 33 which are generally flat and slope very slightly upwardly and inwardly towards the centre of the stand. The upper surface segment 30 is bounded by the side wall 10 and by half of each of two upwardly opening grooves 20 and 21 which extend transversely and diagonally across the upper surface of the bicycle stand. A second upper surface segment 3 is bounded by side wall 13 and by half of each of the two diagonal grooves 20 and 21. Upper surface segments 32 and 33 are, likewise, bounded by side walls 12 and 11, respectively, and half of each of the two diagonal grooves 20 and 21.

Figure 3:
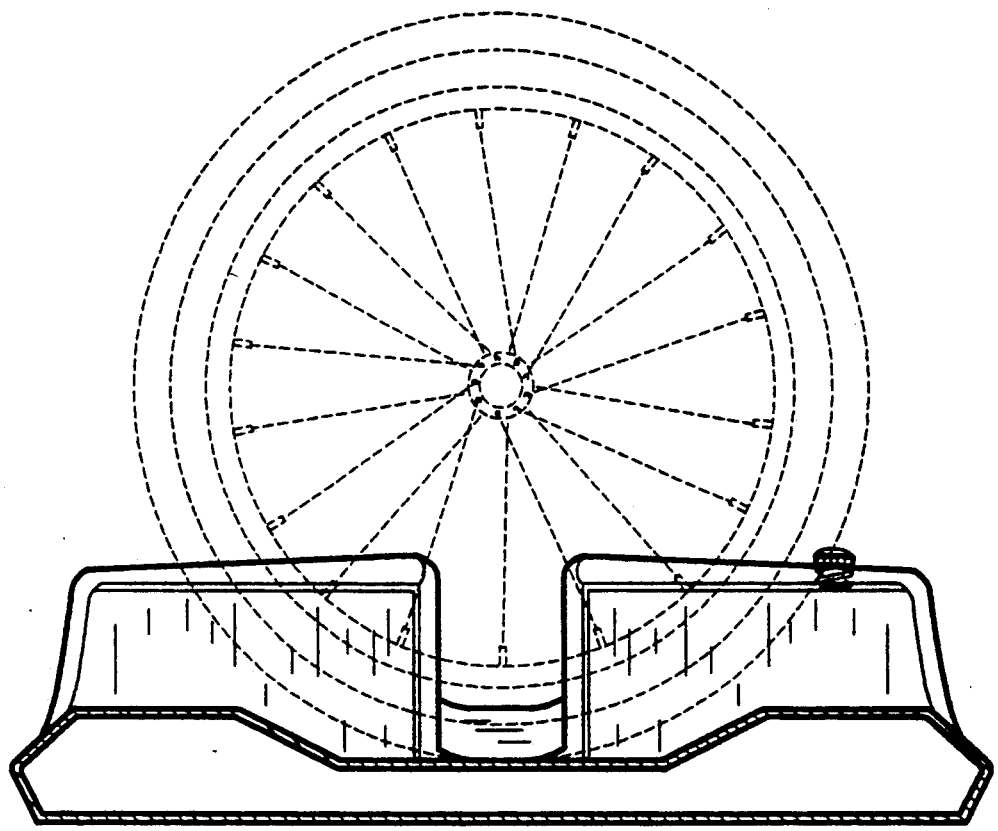
FIG. 3 is a cross-sectional view similar to FIG. 2, but showing a bicycle wheel in position in the stand and supported thereby.

The mutually intersecting grooves 20 and 21 are each designed to provide support to the wheel of a bicycle as a result of which the bicycle as a whole can be maintained in a vertical upright position. Each groove consists of side walls and a two-level bottom wall connected by two inwardly slanting portions. Groove 21 is defined by side walls 1, 2, 3 and 4 and a bottom wall which consists of two equal upper levels 40 and 41 which are connected to a single lower level 45 through two sloping wall portions 50 and 55. Groove 20 diagonally intersects groove 21 and is defined by side walls 5, 6, 7 and 8. The bottom wall of groove 20 (not visible in FIG. 1) is identical in design to that of groove 21. Each groove, though identical in overall design, is, however different in dimension. One groove is of appropriate dimension to support a bicycle (e.g. a racing or touring bicycle) of narrow tire size; the other of wide tire size (e.g. a tire of a trail or mountain bicycle). It should be noted that one of the grooves 20 or 21 gives the particular advantage of providing a means for supporting a bicycle of either a narrow or a wide tire size. The downwardly sloping bottom wall portions 50 and 55 of the grooves allows the bicycle to be wheeled into the bicycle stand and to come to rest on the lower level bottom wall 45 whereby the wheel and the bicycle as a whole can be supported by the side walls in a vertical upright position as shown in FIG. 3. Side walls 1 to 8 or some thereof can be constructed to exhibit slight resilience or compressibility, so as to facilitate accommodation of wheel rims or tires of a range of thicknesses and to improve the snugness of fit of a given tire in the stand.

Figure 2:
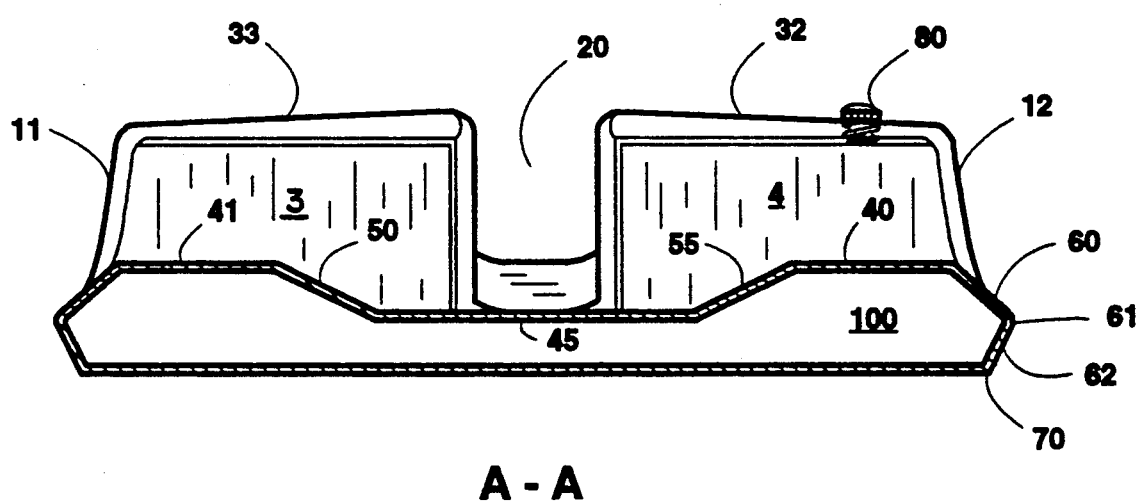
FIG. 2 is a cross-sectional view of the bicycle stand taken along line "A"—"A" in FIG. 1.

The outer side walls of the bicycle stand continue downwardly and outwardly reaching an outward maximum and then continue downwardly and inwardly until reaching the bicycle stand base. For example, as can be seen in FIGS. 1 and 2, side wall 12 includes a downwardly and outwardly extending portion 60 reaching an outward maximum dimension at 61 and then includes a downwardly and inwardly extending portion 62 before finally reaching the base at 70.

Upper surface segment 32 contains a fill-hole and cap 80 whereby ballast material can be introduced into the hollow interior of the stand. The bicycle stand is essentially an empty plastic shell which can contain a ballast material within its hollow interior 100. The presence of ballast material imparts sufficient weight to the bicycle stand structure such that a bicycle can be firmly and reliably supported. Preferably, the ballast material is sand; more preferably, it is water. The ability to remove the ballast material from the stand container when required, affords the bicycle stand the distinct advantage of ready transport due to its light weight. Also its compact design makes for easy storage.

Figure 4:
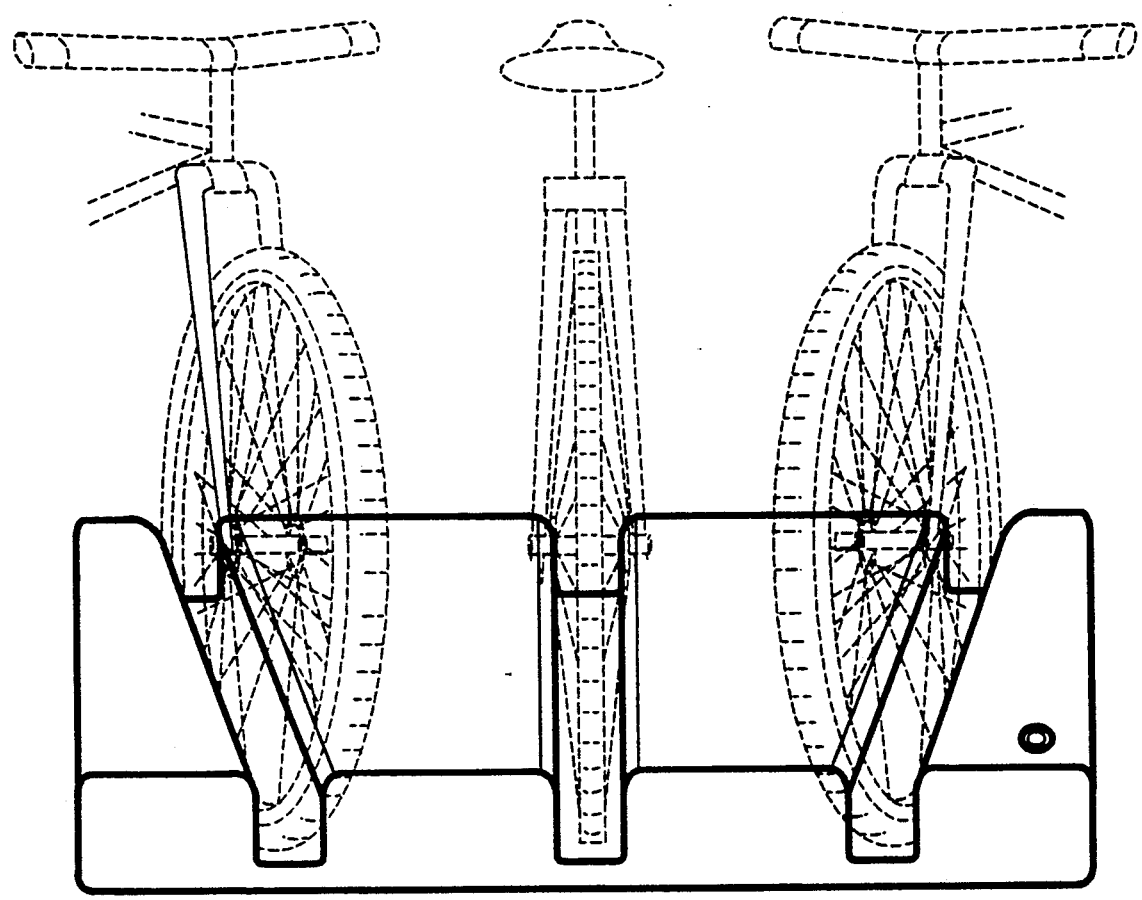
FIG. 4 is a perspective view of a preferred embodiment of invention showing three bicycles simultaneously in position in the stand and supported thereby.
Figure 5:
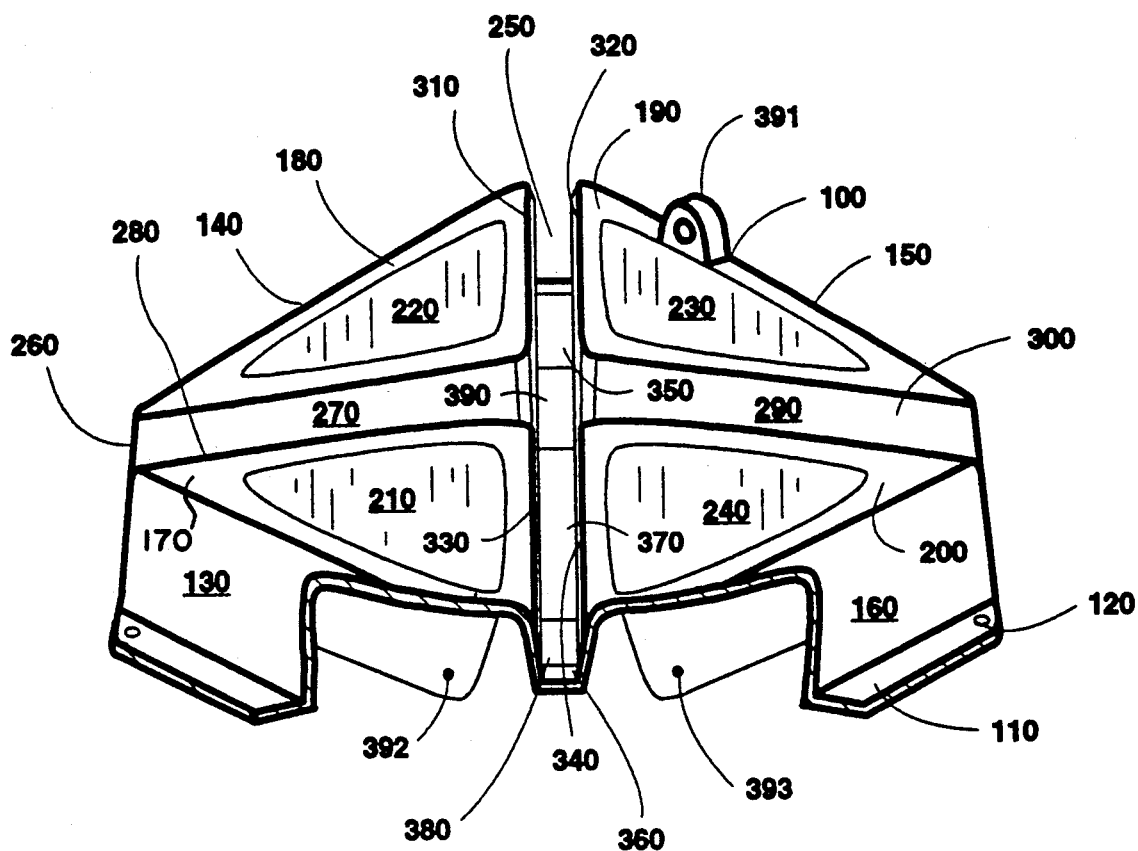
FIG. 5 is a perspective view of a further embodiment of the bicycle stand of the present invention containing a cut-away portion to show clearly the triangular ballast receptacles.

In another preferred embodiment, wherein the design of the stand is in the fashion of the stand depicted in FIG. 1, the approximate external dimensions are 8 inches in height by 18 inches in width by 27 inches in length. In this embodiment, the bicycle stand contains either two parallel grooves centered approximately 12 inches apart or three grooves, the outer two of which converge toward a centre groove which bisects the stand. The two parallel grooves can be dimensioned either both for a narrow rim tire size, both for a wide rim tire size, or one for a narrow rim tire size and the other for a wide tire size. This embodiment has the advantage that two bicycles can be supported simultaneously in side-by-side relationship. For the stand with three grooves the centre groove is dimensioned to accept a narrow or wide rim tire size and the outer grooves are dimensioned to both accept a narrow rim tire size, both accept a wide rim tire size or one accept a narrow rim tire size and the other a wide rim tire size. This embodiment has the advantage that three bicycles can be supported simultaneously. In order to allow for sufficient clearance of the handle bars of the outer bicycles, the centre bicycle is deposited with its rear wheel in the centre groove. FIG. 4 shows a stand of this type supporting in an upright vertical position three bicycles A further embodiment of the bicycle stand of the present invention is shown in FIG. 5, which stand comprises a generally square one-piece injection-molded plastic body 100 preferably with 0.08 inch wall thickness, designed to provide adequate support to a bicycle wheel such that a bicycle can be disposed in a stable vertical upright position when not in use. The stand includes a flat lip or seat 110, preferably projecting out from the base by about 1.25 inches, which surrounds the perimeter of the base of the stand and which merges with the bottom of the outer side walls. Optionally, each corner of the lip or seat contains a hole 120, preferably 3/16 inch in diameter, which allows the stand to be spiked in place in the ground if desired. The stand further comprises four outer side walls 130, 140, 150 and 160, each of similar height, preferably 6.5 inches, and each generally tapering upwardly and inwardly towards the top of the stand.

The top of the stand comprises four upper surface segments 170, 180, 190 and 200 each of which contains a central, generally triangular, receptacle with a flat bottom (210, 220, 230 and 240, respectively) having rounded corners and outwardly and upwardly diverging side walls which merge with their respective upper surface segment. The receptacles are preferably 4 to 6 inches in depth and have a length and width of 7 inches. The four receptacles 210, 220, 230 and 240, which open upwardly and are therefore exposed to the open air, are designed to accept ballast material which imparts sufficient weight to the bicycle stand structure so as to provide stability thereto and facilitate reliable support for a bicycle. Preferably, the ballast material is sand, earth, decorative stone or cement. Again, the ability to remove the ballast material from the receptacles, when desired, affords the bicycle stand the distinct advantage of ready transport due to its light weight. Moreover, its unique design allows a plurality of the stands to be stacked within one another for easy and compact storage.

Each of the upper surface segments is bounded by an outer wall and by the side wall of half of each of two upwardly opening grooves 250 and 260 which extend transversely and diagonally across the upper surface of the bicycle stand. Specifically, upper surface segment 180 is bounded by outer side wall 140 and by the side walls 270 and 310 of grooves 260 and 250, respectively. In a similar fashion upper surface segments 170, 190 and 200 are bounded by outer sidewalls 130, 150 and 160, respectively, and by groove 250 side walls 330, 320 and 340, respectively, and by groove 260 side walls 280, 290 and 300, respectively. Optionally, the bicycle stand is also provided with a security means in the form of a loop connected to the stand body. In this embodiment, the security loop 391 is disposed on the upper surface segment 150 and has the approximate dimensions of 1⅝ inches in length, ½ inch in width and 1⅝ inches in height with a 1 inch diameter hole. The loop allows a bicycle to be secured to the stand by means of a chain lock or the like.

The mutually intersecting grooves 250 and 260 are each designed to provide support to the wheel of a bicycle as a result of which the bicycle as a whole can be maintained in a vertical upright position. Each groove consists of side walls and a two-level bottom wall connected by two inwardly slanting portions. Groove 250 is defined by side walls 310, 320, 330 and 340 and a bottom wall which consists of two equal upper levels 350 and 360. Preferably, each of the upper levels is 2.5 inches in height from the stand base, and the upper levels are connected to a single lower level 370, preferably ½ inch in height from the stand base, through two sloping wall portions 380 and 390, preferably each about 5.4 inches in length. Groove 260 diagonally intersects groove 250 and is defined by side walls 270, 280, 290 and 300. The bottom wall of groove 260 (not visible in FIG. 5) is identical in design to that of groove 250. Each groove, though identical in overall design, is, however, different in dimension. One groove is of appropriate dimension to support a bicycle (e.g. a racing or touring bicycle) of narrow rim tire size; the other of wide rim tire size (e.g. a tire of a trail or mountain bicycle). It should be noted that one of the grooves 250 or 260 gives the particular advantage of providing a means for supporting a bicycle of either a narrow or a wide rim tire size. The downwardly sloping bottom wall portions 380 and 390 of the grooves allows the bicycle to be wheeled into the bicycle stand and to come to rest on the lower level bottom wall 370 whereby the wheel and the bicycle as a whole can be supported by the side walls in a vertical upright position in a similar fashion to that shown in FIG. 3.

At the bottom of each ballast receptacle and at the lowest level 370 of the intersecting grooves is located a drainage hole, for example ¼ inch in diameter, to drain rain water and prevent its collection. In FIG. 5, the drainage holes for receptacles 210 and 240 are represented by 392 and 393, respectively.

Figure 6:
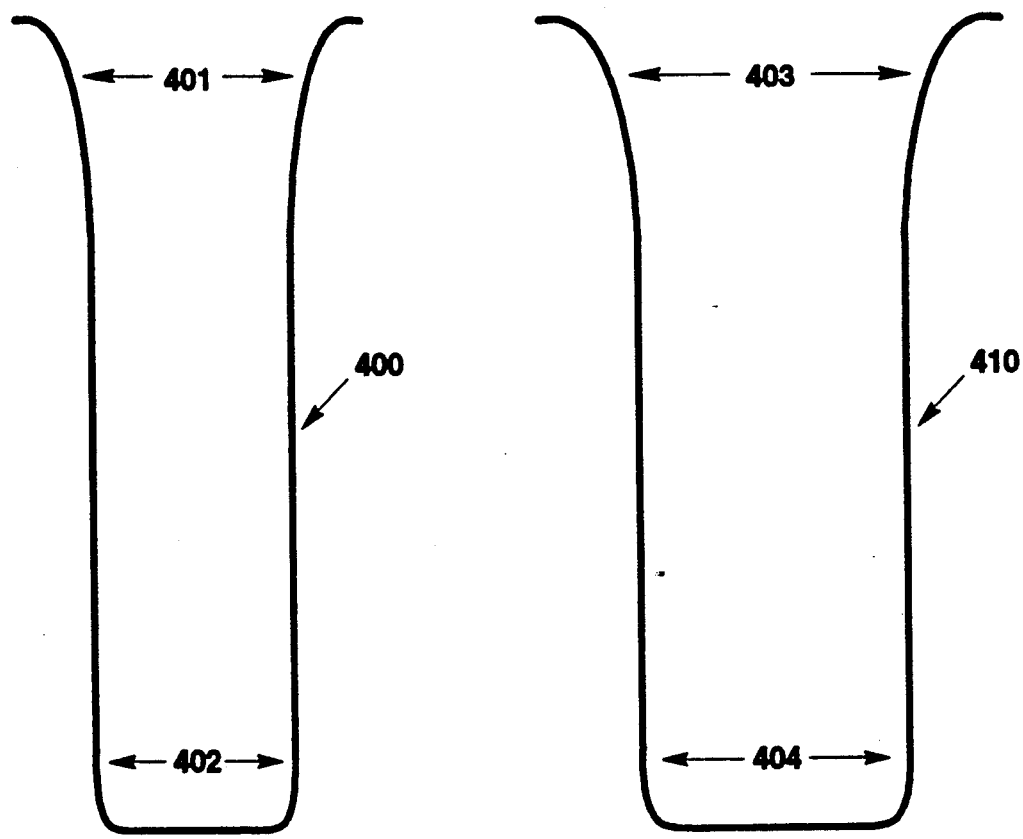
FIG. 6 shows the preferred geometry of the grooves designed to accept a narrow- and a wide-rim bicycle tire.

With reference to FIG. 6, the preferred dimensions of a groove designed to accept a narrow rim bicycle tire 400 is 1.5 inches in width at a groove top 401 and 1 3/16 inches in width at the groove bottom 402. The preferred dimensions of a groove designed to accept a wide rim bicycle tire 410 is 2 5/16 inches in width at the groove top 403 and 2 inches in width at the groove bottom 404.

Figure 7:
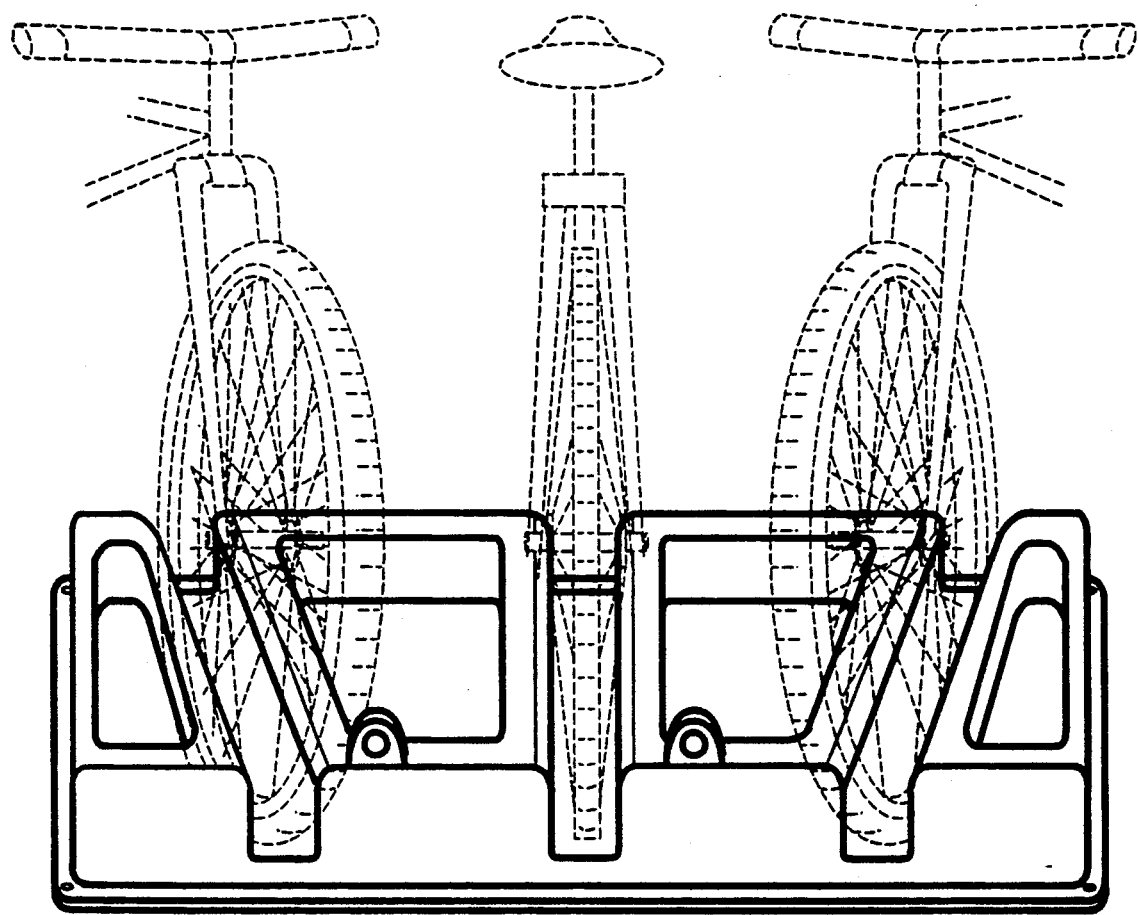
FIG. 7 is a perspective view of a further preferred embodiment of the present invention showing three bicycles simultaneously in position in the stand and supported thereby.

In another preferred embodiment, wherein the design of the stand is in the fashion of the stand depicted in FIG. 5, the approximate external dimensions are 6.5 inches in height by 25 inches in width by 28 inches in length. In this embodiment, the bicycle stand contains three grooves, the outer two of which converge toward the centre groove which bisects the stand. In this case, the centre groove, is dimensioned to accept a narrow or wide rim tire size and the outer grooves are both dimensioned to accept a narrow rim tire size, both to accept a wide rim tire size or one to accept a narrow rim tire size and the other a wide rim tire size. This embodiment has the advantage that three bicycles can be supported simultaneously as shown in FIG. 7. In order to allow for sufficient clearance of the handle bars of the outer bicycles, the centre bicycle is deposited with its rear wheel in the centre groove. Optionally, the stand of this embodiment may be provided with a security means in the form of one or more loops, preferably two, connected to the stand body. In FIG. 7 is shown two loops, each disposed on the upper surface of the stand body. The loops are designed to accept means to secure the bicycle to the stand such as a chain lock or the like.

At the bottom of each ballast receptacle and at the lowest level of each groove is located a drainage hole, for example ¼ inch in diameter, to drain rain water and prevent its collection.

The bicycle stand of the present invention including any embodiment thereof can be manufactured, for example, by injection molding, blow molding or vacuum forming.

We claim:

1. A bicycle stand for supporting a bicycle in an upright position, which stand comprises a one piece body having an upper surface formed with at least one groove extending transversely therethrough for the reception of a bicycle wheel, said at least one groove being integral with said body and being of a width to receive, engage and support the wheel of a bicycle, and said upper surface having formed therein a plurality of upwardly opening receptacles for receiving and retaining ballast material, each of said receptacles being defined by walls bounded completely thereabout for the confining of ballast material therein, and said receptacles being of substantially greater width than the width of said at least one groove.

2. A bicycle stand as claimed in claim 1, wherein the body is provided with at least partially flat undersurface.

3. A bicycle stand as claimed in claim 1, wherein the upper surface of said body is formed with at least two grooves.

4. A bicycle stand as claimed in claim 3, wherein said grooves are approximately 12 inches apart.

5. A bicycle stand as claimed in claim 3, wherein said grooves are both dimensioned to accept a narrow rim tire size, both dimensioned to accept a wide rim tire size or one is dimensioned to accept a narrow rim tire size and the other a wide rim tire size.

6. A bicycle stand as claimed in claim 1, wherein the upper surface of said body is formed with three grooves spaced apart along a longitudinal axis of the upper surface, a centre one of said three grooves bisects the stand upper body surface and the outer two of said grooves converge towards the centre groove.

7. A bicycle stand as claimed in claim 6, wherein said centre groove is dimensioned to accept a narrow or wide rim tire size and said outer grooves are both dimensioned to accept a narrow rim tire size, both to accept a wide rim tire size or one to accept a narrow rim tire size and the other a wide rim tire size.

8. A bicycle stand as claimed in claim 6, wherein the stand is also provided with a security means in the form of at least one loop connected to the stand body, said security means being adapted to accept a bicycle locking device.

9. A bicycle stand as claimed in claim 1, wherein said body is constructed of blow-molded plastic, has an internal volume of approximately 7 gallons, and has external dimensions of approximately 8 inches in height by 18 inches square.

10. A bicycle stand as claimed in claim 1, wherein said body is constructed of injection-molded, blow-molded or vacuum-formed plastic, has external dimensions of approximately 6.5 inches in height by 18 inches square, has a 1.25 inch seat around and extending from the perimeter of the base of the stand.

11. A bicycle stand as claimed in claim 1, wherein said body is constructed of injection-molded, blow-molded or vacuum-formed plastic, has external dimensions of approximately 6.5 inches in height, 34 inches in length and 25 inches in width, has a 1.25 inch wide seat around and extending from the perimeter of the base of the stand.

12. A bicycle stand as claimed in claim 1, wherein said ballast material is water or sand.

13. A bicycle stand as claimed in claim 1, wherein said receptacles are adapted to receive and retain ballast material selected from the group comprising decorative stone, sand, earth and cement.

14. A bicycle stand for supporting a bicycle or bicycles in an upright position, which stand comprises a one piece molded or formed body including upwardly opening receptacles being of a width for receiving ballast material; each of said receptacles being defined by walls bounded completely thereabout for confining ballast material therein, said body having an upper surface formed with two diagonally intersecting grooves extending transversely therethrough for the reception of a bicycle wheel or wheels, wherein said grooves are integral with said molded or formed body and are of appropriate dimensions to receive and support the wheel of a bicycle, and said grooves being of a substantially lesser width than said receptacles, said stand also being provided with security means in the form of a loop connected to the stand body, said security means being adapted to accept a bicycle locking device.

15. A bicycle stand as claimed in claim 14, wherein one of the said diagonal grooves is dimensioned to accept a narrow rim tire size and the other is dimensioned to accept a wide rim tire size.

* * * * *